INVENTOR.
WILLIAM D. PARKER
BY Harry A. Herbert Jr.
Sherman H. Goldman
ATTORNEYS

United States Patent Office 3,489,863
Patented Jan. 13, 1970

3,489,863
ANALOG RECORDER APPARATUS AND METHOD UTILIZING MAGNETOSTRICTIVE TUBE-SHAPED RECORD MEDIA WITH FRINGE GAP
William D. Parker, Woodland Hills, Calif., assignor to the United States of America as represented by the Secretary of the Air Force
Filed Feb. 13, 1967, Ser. No. 616,440
Int. Cl. G11b 5/00
U.S. Cl. 179—100.2                         8 Claims

ABSTRACT OF THE DISCLOSURE

A stress scanned, magnetic analog recorder having a longitudinally grooved hollow ferromagnetic tube with an ultrasonic transducer at one end, shock absorption structure at the other end and a conductor within. The tube may be rotated adjacent a tape playback head for reproduction of the recorded phenomenon.

This invention relates to the recording and storing of analog data amplitude-time history using a magnetic storage medium and, more particularly, to a stress scanned magnetic analog recorder.

The device of this invention is utilized to record and store environmentally induced transient effects in electronic circuits or other momentary signals where time interest is in the order of a small fraction of a second. Basically, the device comprises a short length of ferromagnetic tubing which has a positive magnetostrictive constant and a conductor extending into the tubing. An ultrasonic transducer at one end of the tube is utilized to initiate a shock wave down the tube toward a means for avoiding reflection of the shock wave at the other end of the tube.

Since the electrical conductor in the tubing carries the signal current to be recorded, it causes a circumferential magnetic flux to be set up in the tubing at the same time that a narrow stress wave is caused by the ultrasonic transducer to be propagated down the tube. The magnetic domains within the length of tubing encompassed by the shock wave at any instant of time are aligned in the same direction as the flux produced by the signal current as a result of the magneto-stress relationship known as the "Villari Effect." Depending upon the materials of which the tube is comprised, the tube may have either positive or negative magnetostrictive constants. Once the shock wave passes there is a net polarization known as remanent flux which is determined by the instantaneous signal current flux.

A longitudinal groove along the tube allows for recorded flux to fringe out into the air at the location of the groove, thereby allowing recording or playback by means of a conventional playback head. Thus, there is provided an instrumentation device capable of recording data of extremely short time periods such as that of explosions and transient radiation effects testing.

Accordingly, it is a primary object of this invention to provide a stress scanned magnetic analog recorder.

It is another object of this invention to provide a stress scanned analog recorder capable of recording data for extremely short time periods.

It is still another object of this invention to provide a stress scanned magnetic analog recorder which has no moving parts and which is insensitive to transient and radiation damage.

It is a further object of this invention to provide a stress scanned analog recorder which is of extremely small size and may not require transistors, vacuum tubes or connection cables to a signal source.

It is a still further object of this invention to produce a stress scanned magnetic recorder which utilizes a longitudinally grooved, ferromagnetic tube having a positive magnetostriction constant in conjunction with ultrasonic transducers and a conductor such that the stored data may be removed from the longitudinal groove.

Another object of this invention is to provide a stress scanned magnetic analog recorder wherein a remanent flux level provides a signal corresponding to an input signal as a function of position along the tube which is correlated as a function of time.

Still another object of this invention involves the provision of a stress scanned magnetic analog recorder from which information may be recovered by rotating the ferromagnetic recording tube on a mandrel at high speed proximate to a magnetic tape recorder playback head, such that the voltage induced in the playback head by the fringe flux as a function of position along the length of the tube corresponds to the recorded signal current as a function of time.

A further object of this invention involves the provision of a stress scanned magnetic analog recorder which is easy and economical to produce of conventional, currently available materials that lend themselves to standard mass production manufacturing techniques.

These and other advantages, features and objects of the invention will become more apparent from the following description taken in connection with the illustrative embodiments in the accompanying drawings, wherein.

Figure 1:
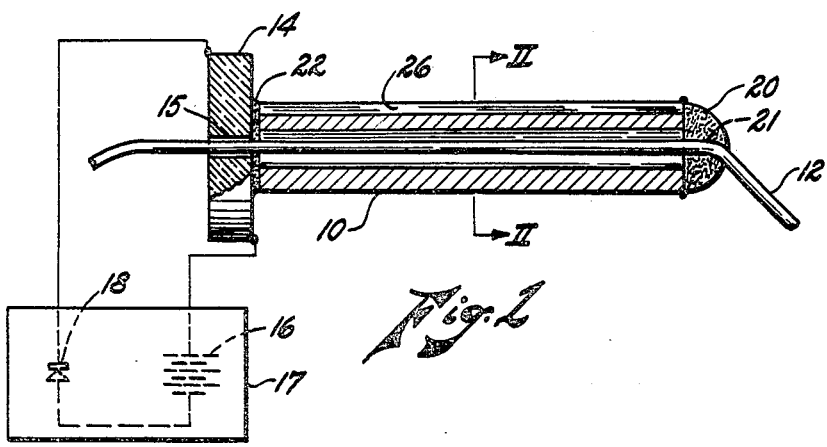
FIGURE 1 is a schematic representation, partly in section, of the stress scanned magnetic analog recorder of this invention.
Figure 2:
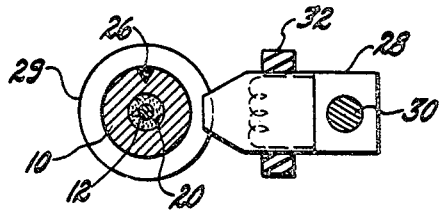
FIGURE 2 is a sectional along lines II—II of FIGURE 1 and includes an illustration of a tape playback head for reading out the information from the recording structure.

Referring to FIGURES 1 and 2, there is shown a short length of ferromagnetic tubing 10 which is utilized as the recording medium. An electrical conductor 12 extends coaxially through the ferromagnetic tube 10 and carries the signal current which is to be recorded. The signal current through conductor wire 12 will cause a circumferential magnetic flux to be set up in the tubing 10; however, this flux alone would not be sufficiently strong to produce any appreciable permanent magnetism in the ferromagnetic tube.

In order to aid in providing an induced permanent magnetism, an ultrasonic transducer in the form of a crystal 14, having a hole 15 to accommodate the signal carrying conductor 12, is provided at one end of the ferromagnetic tube 10 with a silicon grease film 22 therebetween. The ultrasonic transducer is required to cause a narrow stress wave to be propagated down the tube 10 to its opposite end at a rate determined by sonic velocity in the tube material.

The capability for providing for the propagation of the stress wave down the tube at the same time that the event to be recorded occurs is achieved by having the crystal 14 connected to a signal source which is synchronized with the event to be measured. As is shown in FIGURE 1, the synchronized source means 17 is arranged to operate the crystal 14 and, for example, may contain a source of electromotive force 16 connected together with a diode 18 to complete the circuit. Radiation, for example, light from the event to be measured would produce a pulse from the diode 18 which may be photosensitive such that the pulse is synchronized with the phenomenon of the event to be measured. The pulse is directed through the crystal 14 to bump the tube 10 away from it to start the shock wave through it. It is assumed that the phenomenon of the event to be measured is capable of inducing a current in the center conductor 12 without any circuitry or external connecting cable; however, if this were not the case, then the center conductor 12 would be connected to the current source caused by the event to be measured and the crystal 14 would be synchronized therewith.

Figure 3:
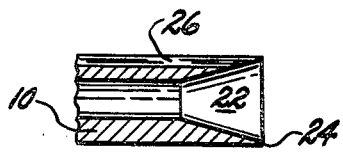
FIGURE 3 is a representation of an alternative embodiment for providing for shock wave absorption.

In order to prevent reflections of the shock from being returned toward the crystal 14, a shock absorbing material 20, having a hole 21 for the conductor 12, is placed at the end of the tube 10 remote from the end having the crystal adjacent thereto. In place of the shock absorbing material 20, the end of the tube 10 could be flared as shown in FIGURE 3 at 22 to a fine edge at 24 in order to provide for dissipation of the shock wave.

If the tubing material has a positive magnetostriction constant, the magnetic domains within the length of tubing encompassed by the shock wave at any instant of time will be aligned in the same direction as the flux produced by the signal current as a result of the magneto-stress relationship known as the "Villari Effect." As the shock wave passes, the domains will relax toward their normal orientations but will come to rest with some net magnetic polarization determined by the instantaneous signal current flux. This is known as remanent flux, the level of which, as a function of position along the tube, corresponds to the signal current as a function of time.

In order that the recorded flux will fringe out into the air a groove 26 is milled longitudinally along the tube 10. As can be seen most clearly in FIGURE 2, a tape reading head 28 may be provided at a distance of a few thousands of an inch from the outer surface of the tube 10 in order to play back the information recorded on the ferromagnetic tube. Of course, a mandrel 29, schematically shown, or other means for rotating the tube at high speed adjacent the tape reading head is required. A translatory relative motion between the ferromagnetic tube 10 and the tape reading head 28 is also required. Accordingly, either item may be made to move; however, it is probably easier to have the tape head 28 moved along the tube 10. This translatory motion may be accomplished by means of a threaded shaft 30, which extends through the internally threaded housing of tape reading head 28. The shaft 30 would also be driven by the mandrel 29 to cause element 28 to be moved longitudinally along the tube between guides 32. If desired, the shock absorbing material 20 and the center conductor 12 could be removed, as is the crystal 14, when the playback of information is to be effected.

Figure 4:
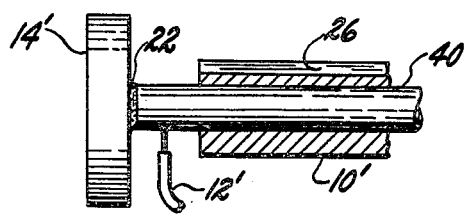
FIGURE 4 is an alternative embodiment showing a different mode of construction of the apparatus.

An alternative arrangement for the recording medium is illustrated in FIGURE 4. Here a crystal 14' is arranged to abut against a conductive core element 40 which has the silicon grease film 22 applied to the end thereof. The signal carrying wire 12' in this embodiment would be secured directly to the conductive metal core, and in place of the grooved ferromagnetic tube 10 a grooved ferromagnetic coating 10' is applied directly to the conductive metal core. The remainder of the device and its operation would be similar to that of FIGURES 1 and 2 in that the voltage induced in a playback head by the fringe flux as a function of position along the length of the tube would then correspond to the recorded signal current as a function of time.

Thus, there has been described a new recording method and an instrumentation device which is capable of recording for extremely short time periods, explosions and radiation effects. The device requires only a signal lead through the grooved tube, which may have the groove in the shape of a V, and an ultrasonic transducer synchronized with the event to be measured.

Although the invention has been described with reference to a particular embodiment, it will be understood to those skilled in the art that the invention is capable of a variety of alternative embodiments. For example, the central conducting wire can be allowed to remain with the ferromagnetic tube when playback is effected or, alternatively, it may be removed together with the shock absorbing material. It is noted that the shock absorbing material may be potted in a conventional manner. I intend to be limited only by the spirit and scope of the appended claims.

I claim:

1. A stress scanned magnetic analog recorder comprising:
   a hollow ferromagnetic tube having a longitudinal groove on its outer surface, said groove functioning to allow any recorded flux to fringe out proximate to said groove for playback by a tape reading head,
   an ultrasonic transducer at one end of said tube for initiating a shock wave down said tube to cause a narrow stress wave to be propagated down said tube,
   means for avoiding a reflection of said stress wave back from the other end of said tube remote from said transducer, and
   an electrical conductor extending through said tube for carrying signal current to be recorded and causing a circumferential magnetic flux to be set up in said tube as said shock wave from said transducer travels down said tube thereby resulting in a net magnetic polarization along said tube determined by the instantaneous signal current flux such that the remanent flux level as a function of position along the tube corresponds to the signal current as a function of time.

2. A stress scanned magnetic analog recorder as defined in claim 1 wherein said ferromagnetic tube has a positive magnetostriction constant.

3. A stress scanned magnetic analog recorder as defined in claim 1 wherein said groove is V-shaped.

4. A stress scanned magnetic analog recorder as defined in claim 1 including a silicon grease film between said transducer and the said one end of said tube.

5. A stress scanned magnetic analog recorder as defined in claim 1 wherein said tube is coated on said central conductor and is arranged to receive the shock wave from said transducer for transmission to said tube.

6. A stress scanned magnetic analog recorder as defined in claim 1 wherein said means for avoiding reflection comprises an internal taper at the other end of said tube which flares to a feather edge.

7. A stress scanned magnetic analog recorder as defined in claim 1 including means connected with said transducer for operation thereof in synchronism with a signal to be measured.

8. A method of recording an event to be measured comprising the steps of:
   causing a current representative of the event to be measured to pass through a wire to cause a circumferential magnetic flux pattern in a grooved ferromagnetic tube, such that said pattern fringes from said groove in order that it may be played back by a tape reading head, and simultaneously launching a shock wave down the tube to cause a narrow stress wave to propagate along said tube such that the remanent flux level as a function of position along said tube corresponds to the current as a function of time.

References Cited

UNITED STATES PATENTS

| | | | |
|---|---|---|---|
| 2,511,178 | 6/1950 | Roters | 179—100.2 |
| 2,683,856 | 7/1954 | Kornei | 179—100.2 |
| 2,780,774 | 2/1957 | Epstein | 179—100.2 |
| 2,921,989 | 1/1960 | Serrell | 179—100.2 |
| 3,016,429 | 1/1962 | Johnson et al. | 179—100.2 |
| 3,049,595 | 8/1962 | Johnson | 179—100.2 |
| 3,051,797 | 8/1962 | Johnson | 179—100.2 |
| 3,053,941 | 9/1962 | Johnson | 179—100.2 |

BERNARD KONICK, Primary Examiner

JEROME P. MULLINS, Assistant Examiner

U.S. Cl. X.R.

340—173, 174